United States Patent [19]
Weiss et al.

[11] Patent Number: 5,340,128
[45] Date of Patent: Aug. 23, 1994

[54] WEAR-RESISTANT CHUCK FOR DRIVING HARD-SHANK BITS

[75] Inventors: Rolf Weiss, Aichwald; Werner Schniepp, Lorch-Waldhausen, both of Fed. Rep. of Germany

[73] Assignee: Josef Albrecht Bohrfutterfabrik GmbH & Co., Wernau, Fed. Rep. of Germany

[21] Appl. No.: 33,126

[22] Filed: Mar. 18, 1993

[30] Foreign Application Priority Data

Mar. 21, 1992 [DE] Fed. Rep. of Germany ........ 4209307

[51] Int. Cl.$^5$ ................................. B23B 31/12
[52] U.S. Cl. ................................. 279/60; 279/46.6; 279/43.6; 279/123
[58] Field of Search ............................. 279/60–66, 279/158, 902, 123, 51–53, 58, 59, 43.6, 46.6; 408/239 R, 240; 269/273, 274, 286

[56] References Cited

U.S. PATENT DOCUMENTS

| | | | |
|---|---|---|---|
| 150,983 | 5/1874 | Stetson | 279/60 |
| 914,255 | 3/1909 | Farnham . | |
| 1,898,264 | 2/1933 | Proefke | 279/123 X |
| 2,346,706 | 4/1944 | Stoner | 279/46.7 |
| 4,752,165 | 6/1988 | Wanner | 279/60 X |
| 4,778,730 | 10/1988 | Zucker . | |
| 4,902,025 | 2/1990 | Zimdars . | |

FOREIGN PATENT DOCUMENTS

| | | |
|---|---|---|
| 0054774B1 | 6/1982 | European Pat. Off. . |
| 3344552A1 | 6/1985 | Fed. Rep. of Germany . |
| 3504917A1 | 8/1985 | Fed. Rep. of Germany . |
| 3503105A1 | 7/1986 | Fed. Rep. of Germany . |
| 3600445A1 | 7/1986 | Fed. Rep. of Germany . |
| 3620901A1 | 1/1988 | Fed. Rep. of Germany . |
| 3644707A1 | 7/1988 | Fed. Rep. of Germany . |
| 3929857A1 | 3/1991 | Fed. Rep. of Germany . |
| 1198531 | 12/1959 | France . |
| 2220336 | 10/1974 | France ................... 279/46.6 |
| 133046 | 11/1978 | German Democratic Rep. .................. 269/286 |
| 54-19282 | 2/1979 | Japan ..................... 279/123 |
| 253531 | 9/1969 | U.S.S.R. .............. 279/46.6 |
| 667331 | 6/1979 | U.S.S.R. .............. 279/123 |

OTHER PUBLICATIONS

Derwent Abstract, Class P, AN 91-140682 & CH-A-677 078 (B. Hribovsek) Apr. 15, 1991.

*Primary Examiner*—Steven C. Bishop
*Attorney, Agent, or Firm*—Frishauf, Holtz, Goodman & Woodward

[57] ABSTRACT

A chuck for driving drill bits an the like having shafts of hardened steel is provided with clamping jaws which at least at their clamping surfaces have a coating of diamond dust, so that they will have a resistance to abrasion that is greater than that of hardened steel. The diamond dust can embed itself in the clamping jaws. The entire chuck jaw may be made with a material having that property or one or more clamping parts of the jaw may be made of such a material, or the coating may be provided on a part of the chuck jaw or on the clamping parts.

18 Claims, 2 Drawing Sheets

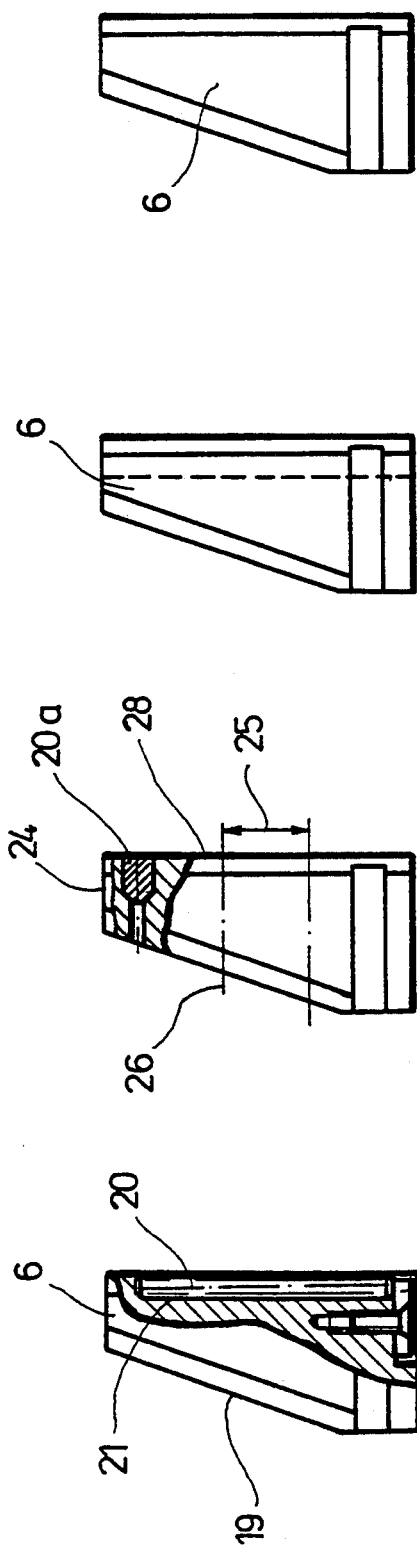

the clamping jaws, the clamping parts being affixed to the
WEAR-RESISTANT CHUCK FOR DRIVING HARD-SHANK BITS

FIELD OF THE INVENTION

This invention concerns a drill chuck having a base body for connection to a rotary drive spindle and having radially shiftable clamping jaws which are guided by a holding sleeve. The clamping jaws have clamping surfaces that can be brought to bear on the shaft of a drill bit, screwdriver bit, or the like by means of an outer sleeve mounted with a bearing on the base body.

BACKGROUND

Drill chucks, which are constructed as so-called three jaw chucks, are common in a variety of useful embodiments. They can set a fixedly settable clamping force by corresponding actuation of the outer sleeve or they can be constructed so that at the beginning of operation self-tightening will take place. Examples of these kinds are described in EP 0054 774 B1, French Patent 1198531, German Patent 588 386 and German patent 37 44 589. Even embodiments with only two clamping jaws, each of which partly surrounds the bit shaft have already become known from U.S. Pat. No. 914,255. In all those drill chucks the clamping jaws are made completely of steel which is hardened at least in the region of the clamping surfaces.

A precise secure clamping of bits having a cylindrical shank, especially drill bits, is possible with the above-mentioned drill chucks. When clamped, the bit shaft, in consequence of the effect of the high surface pressure that arises at the essentially linear or strip-shaped clamping surfaces of the clamping jaws, is subjected to a slight elastic or possibly even plastic deformation which produces a fixed, rotation-resisting clamping of the bit shaft in the clamping jaws. This last-mentioned effect, however, no longer takes place in the case of drill bits which are entirely made of hardened metal or other completely-hard-metal tooling devices Which are today coming more and more into utilization. The hardness of the smooth and exactly cylindrical bit shafts of these bits, which is provided in view of the precision that is to be obtained, is so great that under the effect of the clamping force for which the drill chuck is designed, a highly loadable clamping of the bit shaft is no longer available. That has the result that upon the appearance of a mechanical loading peak there is the danger that the bit shaft will briefly slip with respect to the clamping jaws. That leads quickly to a release of clamping force and damage to the clamping jaws. Increasing the clamping force, by more or less strong manipulation of the positioning means after insertion of the bit shaft can therefore be of no help, for fear of producing plastic deformation of the clamping jaws that would make the chuck unusable.

SUMMARY OF THE INVENTION

It is the object of the present invention to provide a drill chuck that overcomes the above-described difficulties and which will have a long useful life even for use with bits having a clamping shaft of hard metal or of some other material of great hardness.

Briefly, the clamping jaws, typically of steel, are formed with clamping surfaces, which at least in certain regions thereof, are made to have an enhanced resistance to abrasion and wear which is greater than is the case with hardened steel. In accordance with a feature of the invention, the clamping surface has diamond dust applied thereto, which can embed itself in the steel of the jaws.

In one embodiment the clamping jaws can have clamping parts providing a clamping surface which are made of a material of greater resistance to abrasion that the material of the remainder of the clamping jaws (as a rule, steel), the clamping parts being affixed to the clamping jaws. In one example each clamping jaw can have at least one elongate clamping part that is mounted with its length axis running in the length direction of the clamping jaw, thus providing an uninterrupted clamping surface. Alternatively, each clamping jaw may have several oblong clamping parts separately disposed in a row, with provision of corresponding clamping surface regions, separated from each other. The arrangement can also be such that every clamping jaw is equipped with at least one clamping part of the above-mentioned material that is disposed running at right angles to the clamping jaw length direction. This form of embodiment is of particular advantage when it is a question providing regions of enhanced resistance to abrasion that are relatively narrowly bounded.

Simple construction proportions result if in one of the above embodiments the clamping part has an essentially cylindrical cross section. In that way an essentially linear contact at the clamping locations of the bit shaft with correspondingly higher surface pressure can be obtained at mall expense. The clamping parts, however, can also be constituted in an essentially prismatic cross-sectional shape, or some other suitable cross-sectional shape preferably providing essentially linear or strip-shaped clamping surfaces.

Furthermore the clamping parts can be removably fastened to the clamping jaws in order to permit replacement in case of damage or wearing out of the clamping part. They can be set into cavities of the clamping jaws, the cavities at the same time serving as a closely fitting holder. If such replaceability or interchangeability is not important, the clamping parts can be soldered to the clamping jaws.

The new chuck can also be constituted in a different form in such a way that the clamping jaws consist completely of the material having enhanced resistance to wear. Such material, used to make the clamping jaws—or in the case of the above-mentioned embodiments the clamping parts—, can advantageously be a hard metal or an oxide-ceramic material.

In a further embodiment the clamping jaws and/or the clamping parts can be coated with an abrasion-resistant material at least in the region of the clamping surfaces. Such a layer can then conveniently be applied to clamping jaws and/or clamping parts of hard metal or oxide-ceramic, although it is as a rule sufficient for the clamping jaws and/or clamping parts to be made of a softer material, for example steel or a steel alloy, and then to coat them with the abrasion-resistant material.

The layer can contain titanium nitride (TIN) and/or titanium carbide (TIC). It has been found particularly useful for the clamping surface to be coated with diamond dust embedded in a suitable carrier material. The diamond grains cause local elastic or plastic deformation of the hard metal bit shaft and they bury themselves also in their carrier material in the region of the clamping surface, with the result that a highly effective slipless connection between clamping jaw and bit is produced in the clamping of the chuck.

Commonly used hard metal bits and the shafts of such bits as a rule have a hardness of HV 1400 to 1800 (rickets hardness). In order to clamp such bits securely, the clamping jaws or the clamping parts must be correspondingly hard at the clamping surfaces. The clamping jaws or the clamping parts accordingly have, in their regions of enhanced resistance to abrasion, at least in particular locations, a hardness of HV 1800 or more.

BRIEF DESCRIPTION OF THE DRAWINGS

The invention is further described by way of illustrative example with reference to the annexed drawings, in which:

FIGS. 3, 5, 7 and 9 respectively show different embodiments of clamping jaws, in side elevation and partly in section in the case of FIGS. 3 and 5, and FIGS. 4, 6, 8 and 10 are top views of the respective clamping jaws of FIGS. 3, 5, 7 and 9.

DESCRIPTION OF THE ILLUSTRATED EMBODIMENTS

Figure 1:
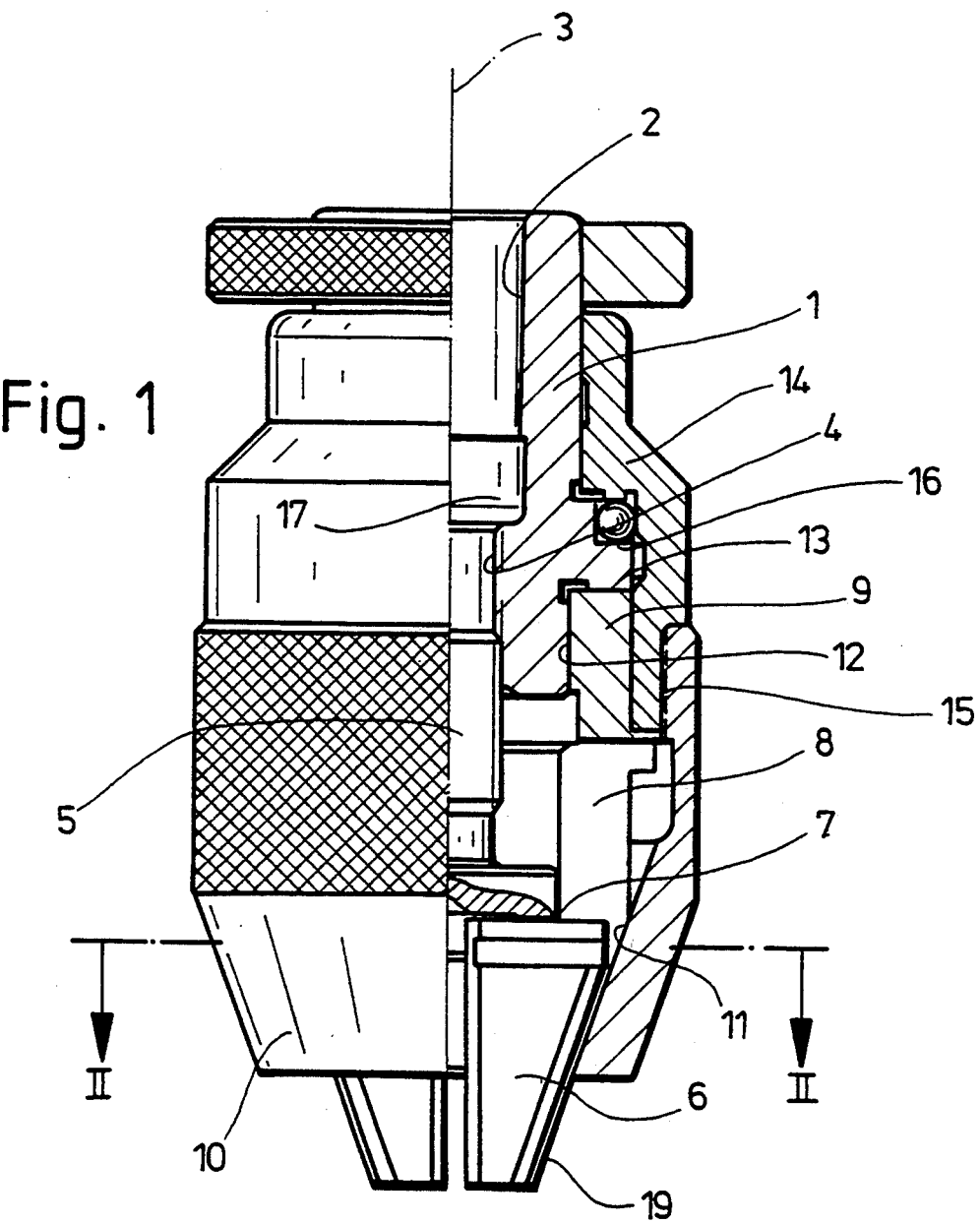
FIG. 1 a side view, partly in axial section, of a self-tightening chuck according to the invention.
Figure 2:
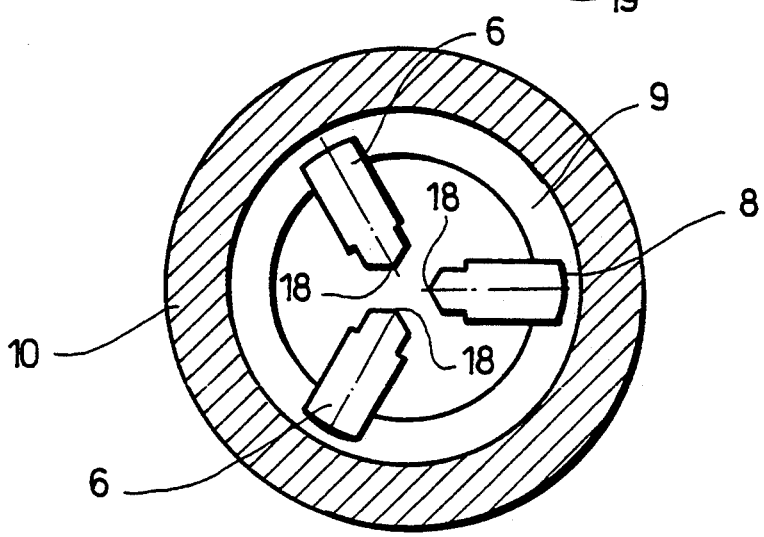
FIG. 2 is a cross section on the line II—II of FIG. 1, in top view.

The 3-jaw drill chuck shown in FIGS. 1 and 2 is a so-called self-tightening chuck. It has an essentially cylindrical base body 1, which is made with a slightly conical inner surface 2 for attachment to a corresponding spindle. A pressure spindle 5 is screwed into an axial threaded bore 4 of the base body 1 which is coaxial with the axis of rotation 3 of the base body. Three clamping jaws 6 are axially supported on the pressure spindle 5.

The clamping jaws 6 are coupled at one end 7 to the pressure spindle 5 fixedly with respect to rotation and radially shiftable. They are mounted in corresponding guide grooves 8 of a holding sleeve 9, which is surrounded by an outer closing sleeve 10, which in turn cooperates radially with the clamping jaws 6 by means of an internal conical surface 11 of the outer The holding sleeve 9 is rotatably mounted on a cylindrical surface 12 of the base body 1 and is axially supported by abutment on an annular shoulder 13 formed in the base body 1. A closely fitting coaxial sleeve 14 is pushed onto the end of the holding sleeve 9 and is pinned thereto so as to rotate therewith. The coaxial sleeve 14 has outer threading 15 at its forward end for screwing on the outer closing sleeve 10. Finally, between the coaxial sleeve 14 and a second annular shoulder 16 of the base body 1, roll bodies 17 are disposed which support the rear coaxial sleeve 14 and the holding sleeve 9 axially on the annular shoulder 16 of the base body 1.

The three clamping jaws 6, on their straight inner or clamping sides facing the axis of rotation 3 each have a clamping surface 18.

In accordance with a feature of the invention, the surface 18 is directed exactly parallel to the axis of rotation 3. The surface 18 is so disposed that in tightening an essentially linear or stripe shaped contact results with the shaft of the bit or other rotary tool that is to be clamped in place (not shown), thus producing a high surface pressure in this clamping region.

For clamping a drill bit, the shank or shank of a screwdriver or other tool, hereinafter referred to as a bit, the shaft of the bit is inserted into the chuck when the clamping jaws are in open position, as shown in FIG. 2. Then with rotation of the upper closing sleeve 10 in the closing direction, the holding sleeve 9, the clamping jaws 6 and the pressure spindle 5 are rotated with it. With that rotation the pressure spindle 5 is advanced out of the threaded bore 4 progressively, with the consequence that the essentially triangular clamping jaws 6 are downwardly shifted (FIG. 1) by their oblique conical surfaces 19 along the internal conical surface 11 of the outer closing sleeve 10, whereby they are gradually shifted radially inwards.

When a bit thus clamped engages a load in operation of the chuck, the pressure spindle 5 can still rotate somewhat farther with respect to the driven base body 1 through the coupling of the bit shaft with the clamping Jaws 6, so that an automatic after-clamping (self-tightening) effect takes place.

In order to make possible a reliable positioning of the chuck for tightening bits having bit shafts of very hard material, for example hardened metal, the clamping jaws 6 are manufactured in a special form which will now be explained with reference to FIGS. 3-10.

In all of these illustrated embodiments, the clamping surface 18, at least in a region thereof and in accordance with another feature of the invention, is provided with a layer 29 (FIG. 10) of diamond dust, that is, a material having higher resistance to abrasion compared to hardened steel. For this purpose these clamping surfaces, in the region of increased resistance to abrasion, have a hardness, at least in significant places, of HV 1800 or more.

In the first three embodiments (FIGS. 3–8) every clamp jaw is provided, on its straight jaw side facing the axis of rotation (FIG. 1), with at least one jaw portion carrying the jaw surface 18, that jaw portion being affixed to the clamping jaw 6 and consisting of a material and/or coated with a material which has increased resistance to abrasion in comparison with the material of the remainder of the clamping jaw 6 (which is usually of steel).

For this purpose in the clamping jaws corresponding to FIGS. 3 and 4 there is used, in each case, an elongated jaw component 20 in the shape of a hard metal cylindrical pin or rod, which is seated over its length in a slot-like open axial bore 21 of the clamping jaw 6 with its open side facing the axis of rotation 3. The axial bore 21 is endwise a blind bore. It is closed off at the end of the clamping jaw 6 by a closure platelet that axially fixes the cylindrical pin and is affixed by means of a Philips-head machine screw 23.

The clamping surface 18 is provided on the laterally protruding free part of the cylindrical pin 20. It engages the likewise cylindrical shaft of the bit to be clamped at a (theoretical) line of contact and thereby produces a high surface pressure in the clamping region.

Whereas in the embodiments shown in FIGS. 3 and 4 there is provided a cylindrical clamping element 20 extending over the full axial length of the clamping surface 18, that clamp element 20 being positioned with its longitudinal axis aligned in the length dimension of the clamping jaw. In the case of the embodiment shown in FIGS. 5 and 6 the configuration is such that each clamping jaw has several lengthwise clamp elements 20a separated from each other in a row. The clamp elements 20a are each formed by small cylindrical pins of hard metal which are inserted in corresponding line bores extending from the straight side of the clamping jaws. The blind bores 24 are shown in the illustrated embodiment in uniform axial spacing indicated at 25 with their axes 26 in a common mid plane 27 (FIG. 6) of the clamping jaw 6 in question. Each clamp element 20a carries, on its end surface protruding out of the blind bore, 24 a roof-like or wedge-shaped clamp surface 18. The clamping surfaces 18 of the clamping elements 20a can protrude beyond the edge region 28 (FIG. 5) lying between the elements 20a, but it is as a rule to be preferred for the clamping jaws 6 to be made prismatic over their entire axial dimension facing the axis of rotation 3 in such a way that the surface regions 28 made of a softer material will also have effect as part of the clamping surface. The clamp elements 20a are pressed into their blind bores 24 and can be additionally secured there if necessary by means of an adhesive or soldering.

In the third embodiment shown in FIGS. 7 and 8, each clamping jaw 6 is provided with a groove 28 which is symmetrical about the middle plane 27 and extends over the entire axial length of the jaw side facing the axis of rotation 3. In this groove 28 there is inserted, along the entire length of the groove, a clamping element 20b in the form of a fitting hard metal thick strip which is hard-soldered in the groove 28. The hard metal strip is shaped prismatically on its longitudinal side protruding from the groove 28 so that it has two surfaces intersecting each other at an angle of about 120° which carry a narrow strips shaped clamping surface 18.

In the case of the fourth embodiment shown in FIGS. 9 and 10, the clamping jaws 6 are entirely made of a material having high resistance to abrasion, in other words of hard metal as a rule, and the linear strips shaped clamping surface 18 again lies at the intersection line of two surface regions of the prismatic edge of the clamping jaw 6 meeting at an angle with each other of about 120°.

In the embodiments above described of the clamping jaw 6 the clamping parts 20, 20a, 20b and, in the case of FIGS. 9 and 10, the clamping jaw 6 as a whole, are made of a material, as mentioned above, which has a hardness at least as great as the hardness of the bit shaft which is to be clamped. These clamping elements 20, 20a and 20b, and likewise the entire clamping jaw in the case of FIGS. 9 and 10, can further be provided with an abrasion-protection layer, especially a layer of titanium nitride or titanium carbide (TiN or TiC). Other forms of embodiment may well be considered in which the clamping parts 20, 20a, and 20b (and the entire clamping jaw 6 in the case of FIGS. 9 and 10), would be made of a softer material, for example alloyed steel and, at least in the region of the clamping surfaces 18, is at least in part provided with the above-mentioned kind of layer.

A particularly effective clamping of very hard bit shafts, for example shafts made of hard metal, can be obtained by a further embodiment of the clamping jaw 6 which is indicated schematically by a broken line in FIG. 10. In this case a diamond layer 29 is applied which consists of diamond dust consolidated in a binder of synthetic resin defining the clamping surfaces 18 which intersect each other at an angle of about 120° and durably covering the surface region 30 over its length in such a way that the clamping surface 18 is produced on the surface of the diamond dust layer.

The clamping jaws themselves are as a rule made out of steel in this illustrated example. It is also conceivable that the diamond dust layer 29 would be applied to special carrier elements, somewhat as shown in FIGS. 3 to 8.

The clamp elements 20, 20a, 20b may be either releasably or unreleasably connected to the clamping jaw 6.

Although the invention has been described with reference to particular illustrative embodiments, it will be understood that further variations and modifications are possible within the inventive concept.

We claim:

1. A chuck having:
   a base body for affixation to a drive spindle, said base body defining an axis of rotation;
   radially movable clamping jaws carrie din said base body, situated for engaging and clamping a shift of a bit,
   each said clamping jaws, or a clamping part affixed to a respective jaw having at least one clamping surface for engaging said shaft of a bit,
   means rotatably mounted on said base body for positioning said clamping jaws,
   wherein said clamping surfaces in said clamping jaws or clamping parts are directed exactly parallel to said axis of rotation and have a shape resulting, when engaging said shaft of a bit, in an essentially linear or stripleike contact with said shaft; and
   wherein said clamping jaws or said clamping parts affixed thereto, at last in the region of their clamping surfaces, are coated with a layer of grains of diamond dust, and the material of said clamping jaws or said clamping parts affixed thereto in said regions is softer than said diamond dust, to permit grains of said diamond dust to embed themselves and to bury themselves in said material, whereby, at least in said regions, said clamping surfaces have the property of greater resistance to abrasion than hardened steel.

2. A chuck according to claim 1, wherein said clamping jaws (6) have clamping parts (20, 20a, 20b) each having a clamping surface (18), said clamping parts being fixedly attached to said clamping jaws.

3. A chuck according to claim 2, wherein each clamping jaw (6) has at least one elongate clamping part (20, 20b) having a longitudinal axis, which part is disposed with its longitudinal direction of the clamping jaw.

4. A chuck according to claim 2, wherein each clamping jaw (6) has a plurality of said clamping parts (20, 20a, 20b, 20c) which are longer than they are wide and which are disposed in a row, spaced from each other, and presenting aligned clamping surfaces.

5. A chuck according to claim 4, wherein at least one of said clamping parts (20a) on each said clamping jaw (6) has its length dimension at right angles to the length dimension of said clamping jaw and to said axis of rotation of said base body.

6. A chuck according to claim 2, wherein said clamping parts (20, 20a) of said clamping jaws have a substantially cylindrical cross-sectional shape.

7. A chuck according to claim 4, wherein said clamping parts (20, 20a) of said clamping jaws have a substantially cylindrical cross-sectional shape.

8. A chuck according to claim 5, wherein said clamping parts (20, 20a) of said clamping jaws have a substantially cylindrical cross-sectional shape.

9. A chuck according to claim 2, wherein said clamping parts (20b) of said clamping jaws have a substantially prismatic cross-sectional shape.

10. A chuck according to claim 3, wherein said clamping parts (20b) of said clamping jaws have a substantially prismatic cross-sectional shape.

11. A chuck according to claim 4, wherein said clamping parts (20b) of said clamping jaws have a substantially prismatic cross-sectional shape.

12. A chuck according to claim 5, wherein said clamping parts (20b) of said clamping jaws have a substantially prismatic cross-sectional shape.

13. A chuck according to one of claims 2–12, wherein the clamping jaws (6) are formed with cavities (24–28) and
wherein said clamping parts (20, 20a, 20b) are set in respective cavities (21, 24–28) of said clamping jaws (6).

14. A chuck according to claim 13, wherein said clamping parts (20, 20a, 20b) are removably set in said respective cavities (21, 24, 28) of said clamping jaws (6).

15. A chuck according to one of claims 2–12, wherein said clamping parts (20, 20a, 20b) are removably affixed to said clamping jaws (6).

16. A chuck according to one of claims 2–12, wherein said clamping parts (20a, 20b) are soldered onto said clamping jaws (6).

17. A chuck according to claim 1, wherein said diamond dust layer has a hardness of at least HV 1800.

18. A chuck according to one of claims 2–12, wherein said diamond dust layer has a hardness of at least HV 1800.

* * * * *